Patented Nov. 21, 1922.

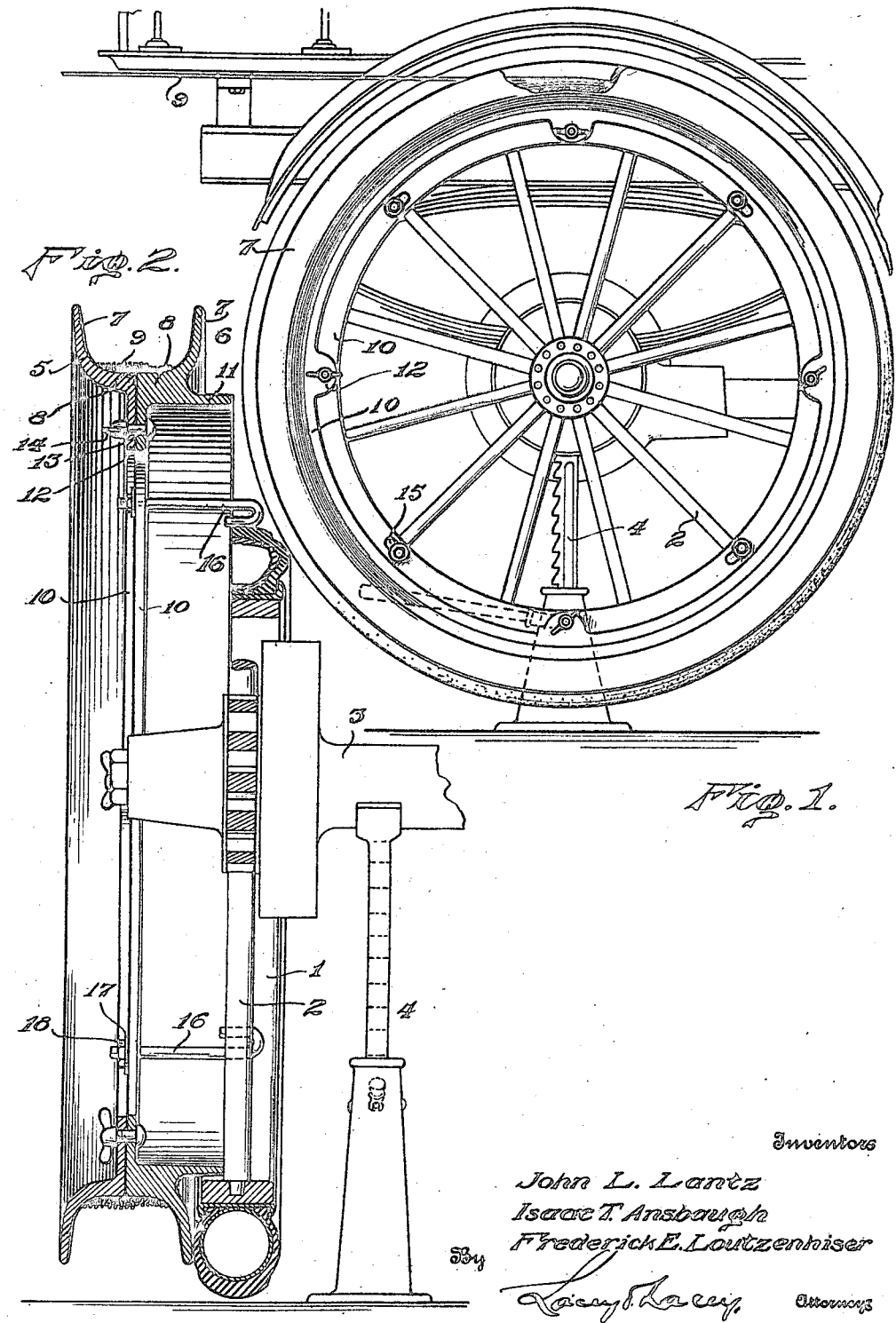

1,436,043

UNITED STATES PATENT OFFICE.

JOHN L. LANTZ, ISAAC T. ANSBAUGH, AND FREDERICK E. LOUTZENHISER, OF ADA, OHIO.

WIRE REEL.

Application filed August 24, 1921. Serial No. 494,917.

*To all whom it may concern:*

Be it known that we, JOHN L. LANTZ, ISAAC T. ANSBAUGH, and FREDERICK E. LOUTZENHISER, citizens of the United States, residing at Ada, in the county of Hardin and State of Ohio, have invented certain new and useful Improvements in Wire Reels, of which the following is a specification.

The object of this invention is to provide a simple, inexpensive and easily operated device for reeling wire as it is drawn taut over telephone or telegraph poles or through conduits, or for maintaining a desired tension upon the wire as it is unwound. The invention also seeks to provide a device which will facilitate the placing of a bundle of wire in position thereon or the removal of wound wire therefrom, and a further object of the invention is to provide a reel which may be very easily and quickly secured to or removed from the driving wheel of an automobile when the use of the reel is desired. The invention is illustrated in the accompanying drawings and will be hereinafter fully set forth.

In the drawings—

Figure 1 is a side elevation of our improved reel showing it in position upon the driving wheel of a motor truck;

Fig. 2 is a transverse section of the same.

In the drawings, the reference numeral 1 indicates the driving wheel of an automobile and 2 the spokes thereof which may be of any usual construction. 3 designates the axle housing and 4 designates a jack which may be engaged under the axle housing in a well-known manner to lift the driving wheel from contact with the ground when our invention is to be operated.

Our improved reel consists of two similar rim members 5 and 6 which are suitably shaped to provide a flange 7 and a rim member 8, the two members when brought together, as shown in Fig. 2, presenting a channeled rim in which the wire 9 may be seated and about which it may be readily wound. From the inner edge of each rim member 8, a flange 10 projects inwardly and a circular flange 11 also projects laterally from one rim member. The flanges 10 obviously will be brought into contact when the reel members are assembled and the flange 10 on that member provided with the flange 11 is deeper than the mating flange 10, as shown clearly in Fig. 1. The narrower flange 10 is provided at intervals with inwardly projecting lugs 12 through which and the mating flange 10 securing bolts 13 are inserted, winged nuts 14 being provided upon the outer ends of said bolts and turned home against the lugs whereby to clamp the two reel members firmly together. The deeper flange 10 is provided at intervals with arcuate slots 15 and J-bolts 16 have their stems inserted through the said slots and their bills engaged around adjacent spokes 2 of the automobile wheel. Washers 17 and nuts 18 are fitted upon the outer extremities of the stems or shanks of the J-bolts and are turned home against the flange 10 to draw the J-bolts into close engagement with the spokes whereby the reel will be securely attached thereto. It is to be noted that the edge of the lateral flange 11 bears against the spokes of the automobile wheel and thereby furnishes the necessary contact between the wheel and the reel to maintain the latter against relative oscillation. The said lateral flange 11 also serves as a spacing member to offset the channeled rim of the reel so that the side of the rim cannot bear upon the tire of the vehicle wheel in such a manner as to chafe and wear the same and also prevents the wire or cable from riding against the tire so as to cut or chafe the same..

The reel having been secured to the driving wheel of the automobile or motor truck, the jack 4 is manipulated to lift the wheel from the ground, after which the end of the wire to be wound may be secured to the rim of the wheel in any convenient manner or may be wrapped once or twice about the reel so as to bind thereon. If the engine of the automobile be then started, the driving wheel will, of course, be rotated about its axis and this motion will be imparted directly to the reel so that the wire will be wound readily thereon. After the wire has been wound, if it be desired to remove the same to permit a repetition of the operation, the nuts 14 are withdrawn and the outer member of the reel may then be easily lifted from the inner member which will remain attached to the automobile wheel. The wound wire may then obviously be lifted from the fixed member of the reel and the removable member returned to its operative position. Our device is exceedingly simple in the construction and arrangement of its parts and may be produced at a very low cost and easily applied to or removed from the driving wheel of the automobile.

Having thus described the invention, what is claimed as new is:

1. A reel for the purpose set forth comprising similar mating members detachably secured together to form a channeled rim, one of said members being provided with a laterally projecting annular flange adapted to bear against the spokes of an automobile wheel and space the channeled rim from the wheel, said member being further provided with a radially disposed annular flange, and means carried by said radially disposed annular flange to attach the reel to a wheel of an automobile.

2. A reel for the purposes set forth consisting of two annular members each having an outwardly projecting annular flange at one side and an inwardly projecting annular flange at its opposite side, said inwardly projecting flanges having flat opposed radial faces whereby they may be placed in abutting contact, means inserted through the abutting inwardly projecting annular flanges to secure the annular members together whereby said members and the outwardly projecting flanges will define a channeled rim, and securing means carried by one of said inwardly projecting flanges to engage a vehicle wheel.

In testimony whereof we affix our signatures.

JOHN L. LANTZ. [L. S.]
ISAAC T. ANSBAUGH. [L. S.]
FREDERICK E. LOUTZENHISER. [L. S.]